US005080312A

United States Patent [19]

Ebey

[11] Patent Number: 5,080,312

[45] Date of Patent: Jan. 14, 1992

[54] SHOE DRYER BRACKET APPARATUS

[76] Inventor: Timothy M. Ebey, 12204 Indianapolis Rd., Yoder, Ind. 46788

[21] Appl. No.: 699,520

[22] Filed: Apr. 14, 1991

[51] Int. Cl.[5] .......... F16M 13/00

[52] U.S. Cl. .......... 248/316.4; 248/200.1

[58] Field of Search .......... 248/200.1, 316.1, 57, 248/176, 316.2, 316.4; 211/34, 35; 34/33, 104, 133, 197

[56] References Cited

U.S. PATENT DOCUMENTS

| | | | |
|---|---|---|---|
| 1,716,708 | 6/1929 | Shepley et al. | 248/200.1 X |
| 1,720,564 | 7/1929 | Noble | 211/35 |
| 3,961,822 | 6/1976 | Daniel | 248/200.1 X |
| 4,084,867 | 4/1978 | Puff et al. | 211/34 X |
| 4,907,311 | 3/1990 | Scott | 211/34 X |

FOREIGN PATENT DOCUMENTS

| | | | |
|---|---|---|---|
| 344944 | 5/1931 | United Kingdom | 211/35 |

*Primary Examiner*—Alvin C. Chin-Shue
*Attorney, Agent, or Firm*—Leon Gilden

[57] ABSTRACT

A bracket structure including a tubular cylinder mounting a cylindrical piston therewithin, wherein the piston is biased exteriorly and coaxially of the cylinder, with a plurality of clamp members mounted at a spaced relationship about the tubular cylinder, with the tubular cylinder arranged for positioning within a wash drum of a washing machine organization.

2 Claims, 5 Drawing Sheets

PRIOR ART

SHOE DRYER BRACKET APPARATUS

BACKGROUND OF THE INVENTION

1. Field of the Invention

The field of invention relates to washing devices, and more particularly pertains to a new and improved shoe dryer bracket apparatus wherein the same attaches a shoe adjacent an interior surface of a washing drum of a washing machine organization to enhance cleaning of a shoe during a typical washing cycle.

2. Description of the Prior Art

The advent of modern synthetic shoes and their ability to be washed in typical washing machines has an accompanying problem of a manner of positioning the shoes to avoid damage to the shoes and other clothing during agitation of the shoes and assorted clothing within a washing cycle of a washing machine. The instant invention attempts to present an organization to position the shoes to permit the shoes to be properly washed while preventing damage to the shoes and clothing within the washing drum. Examples of the prior art include U.S. Pat. No. 4,702,016 to Grigsby wherein a support plate mounts a plurality of magnets to enhance securement of the shoe within a washing drum of a washing machine.

U.S. Pat. No. 4,091,548 to Daily sets forth a rack structure mounted to a door of a drying machine for positioning various articles of clothing therewithin.

U.S. Pat. No. 4,813,641 to Wilson sets forth a support defined by a loop and a suction cup for attaching a shoe and the like to an interior surface of a rotating chamber.

As such, it may be appreciated that there continues to be a need for a new and improved shoe dryer bracket apparatus as set forth by the instant invention which addresses both the problems of ease of use as well as effectiveness in construction in positioning a shoe pair within a washing or drying machine and in this respect, the present invention substantially fulfills this need.

SUMMARY OF THE INVENTION

In view of the foregoing disadvantages inherent in the known types of washing and drying apparatus now present in the prior art, the present invention provides a shoe dryer bracket apparatus wherein the same is arranged for mounting a shoe pair within a dryer structure. As such, the general purpose of the present invention, which will be described subsequently in greater detail, is to provide a new and improved shoe dryer bracket apparatus which has all the advantages of the prior art dryer apparatus and none of the disadvantages.

To attain this, the present invention provides a bracket structure including a tubular cylinder mounting a cylindrical piston therewithin, wherein the piston is biased exteriorly and coaxially of the cylinder, with a plurality of clamp members mounted at a spaced relationship about the tubular cylinder, with the tubular cylinder arranged for positioning within a wash drum of a washing machine organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shoe dryer bracket apparatus which has all the advantages of the prior art dryer apparatus and none of the disadvantages.

It is another object of the present invention to provide a new and improved shoe dryer bracket apparatus which may be easily and efficiently manufactured and marketed.

It is a further object of the present invention to provide a new and improved shoe dryer bracket apparatus which is of a durable and reliable construction.

An even further object of the present invention is to provide a new and improved shoe dryer bracket apparatus which is susceptible of a low cost of manufacture with regard to both materials and labor, and which accordingly is then susceptible of low prices of sale to the consuming public, thereby making such shoe dryer bracket apparatus economically available to the buying public.

Still yet another object of the present invention is to provide a new and improved shoe dryer bracket apparatus which provides in the apparatuses and methods of the prior art some of the advantages thereof, while simultaneously overcoming some of the disadvantages normally associated therewith.

Still another object of the present invention is to provide a new and improved shoe dryer bracket apparatus wherein the same is arranged for simultaneously mounting a shoe pair within a dryer or washer organization for simultaneous drying or washing of the shoe pair.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
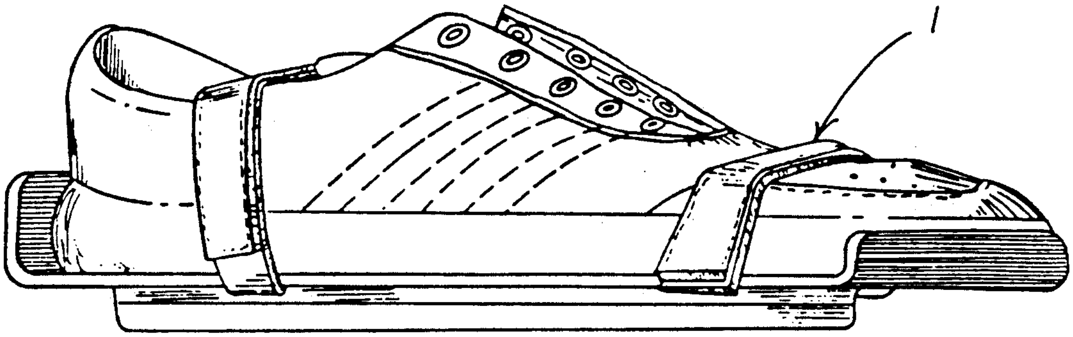
FIG. 1 is an orthographic side view of a prior art shoe dryer bracket apparatus.

With reference now to the drawings, and in particular to FIGS. 1 to 10 thereof, a new and improved shoe dryer bracket apparatus embodying the principles and concepts of the present invention and generally designated by the reference numeral 10 will be described.

Figure 2:
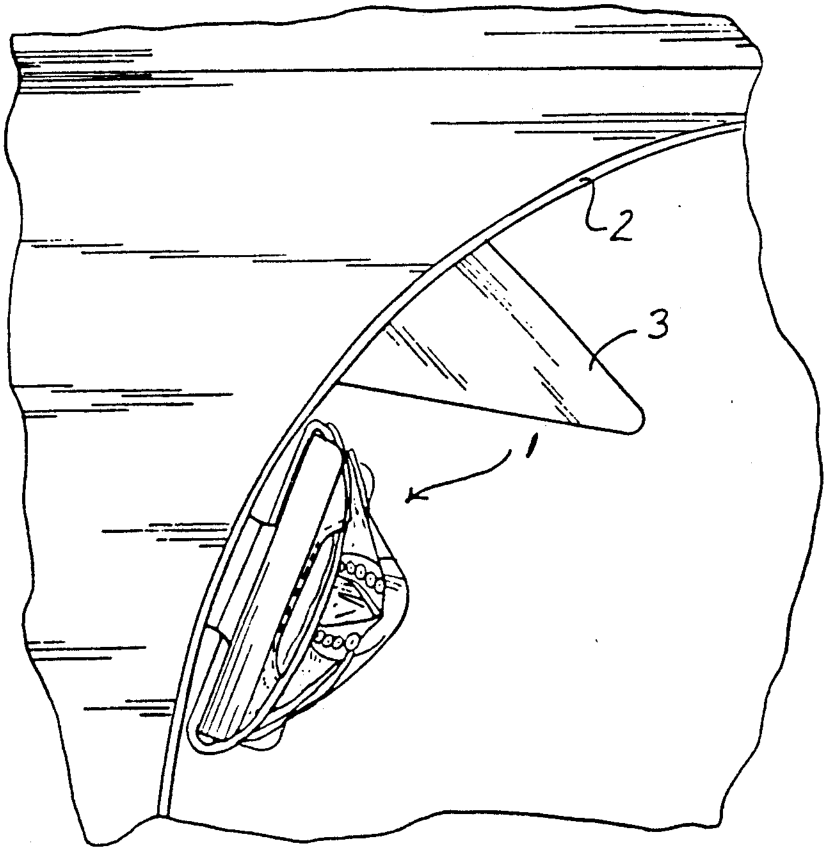
PRIOR ART FIG. 2
FIG. 2 is an orthographic top view of the shoe dryer bracket apparatus of FIG. 1 positioned within a drying device.
Figure 3:
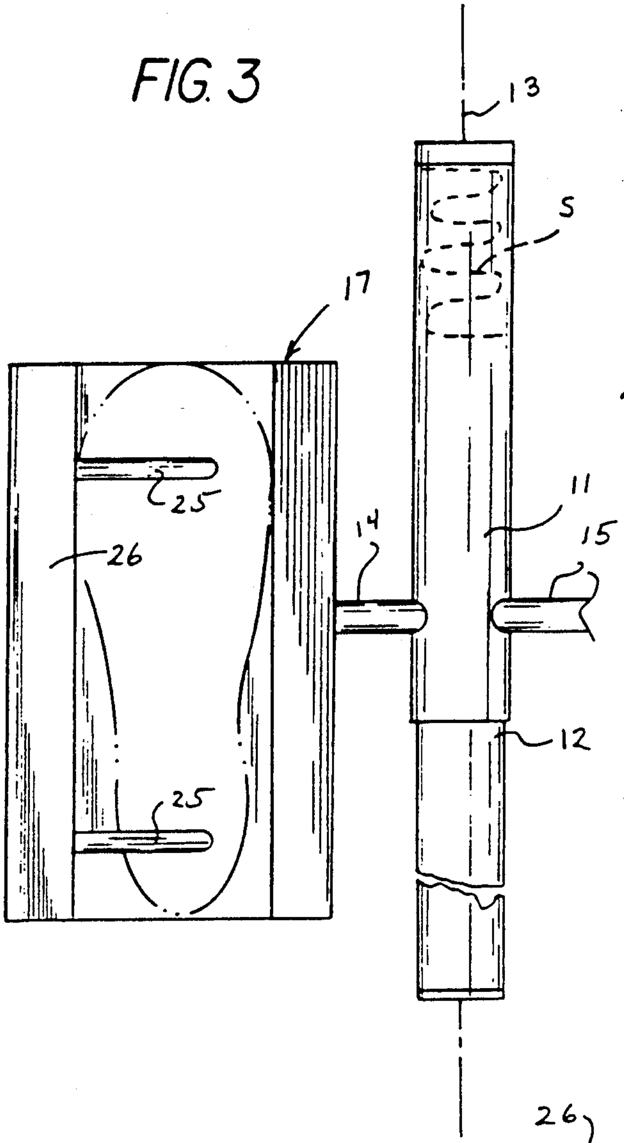
FIG. 3 is an orthographic top view of the instant invention.
Figure 4:
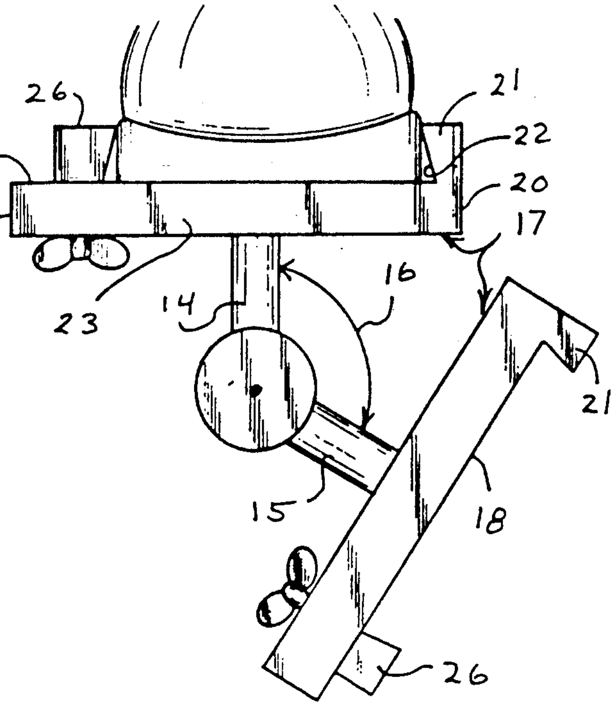
FIG. 4 is an orthographic end view of the instant invention.
Figure 5:
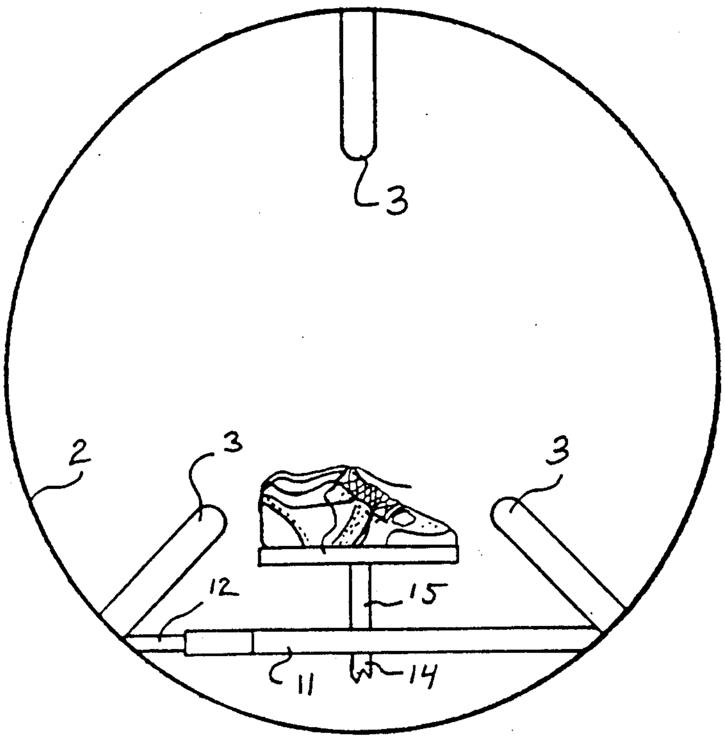
FIG. 5 is an orthographic top view of the invention positioned within a drying machine.

FIG. 1 illustrates a prior art shoe bracket structure 1, as set forth in U.S. Pat. No. 4,702,016 and as illustrated in FIG. 2 positioned within and mounted to an interior surface of a dryer drum 2 adjacent dryer vanes 3 that are mounted radially about an interior surface of the dryer drum 2 projecting interiorly of the dryer drum, wherein the prior art utilizes magnets to secure the bracket to the interior wall of the dryer drum.

Figure 6:
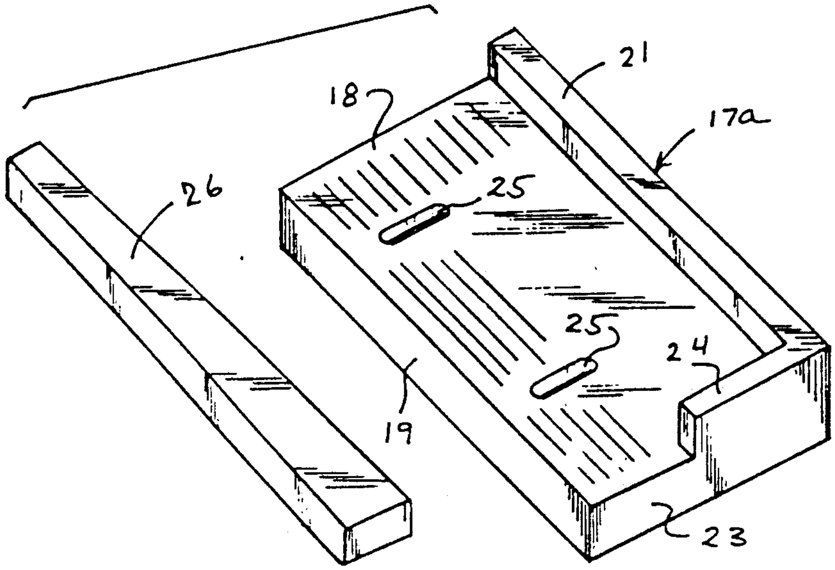
FIG. 6 is an isometric illustration of one of a plurality of shoe clamp members utilized by the instant invention.
Figure 7:
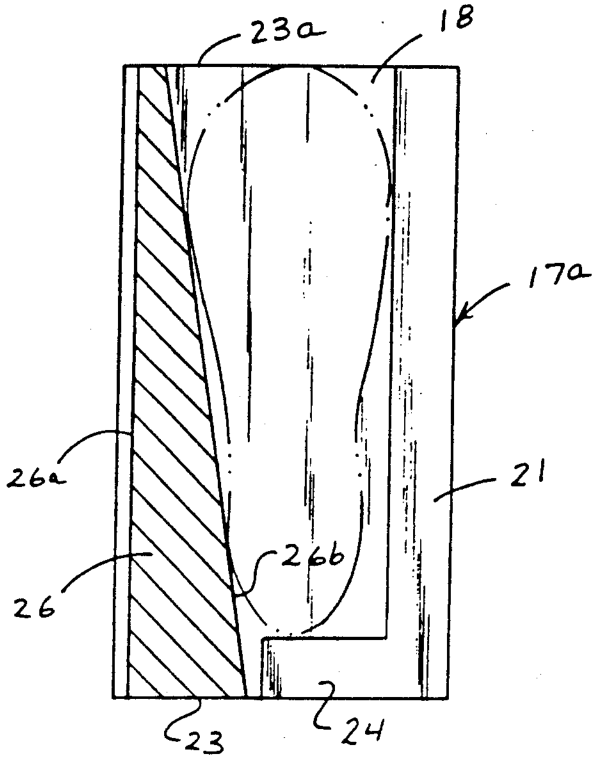
FIG. 7 is an orthographic top view, partially in section, of the modified clamp member as illustrated in FIG. 6.
Figure 8:
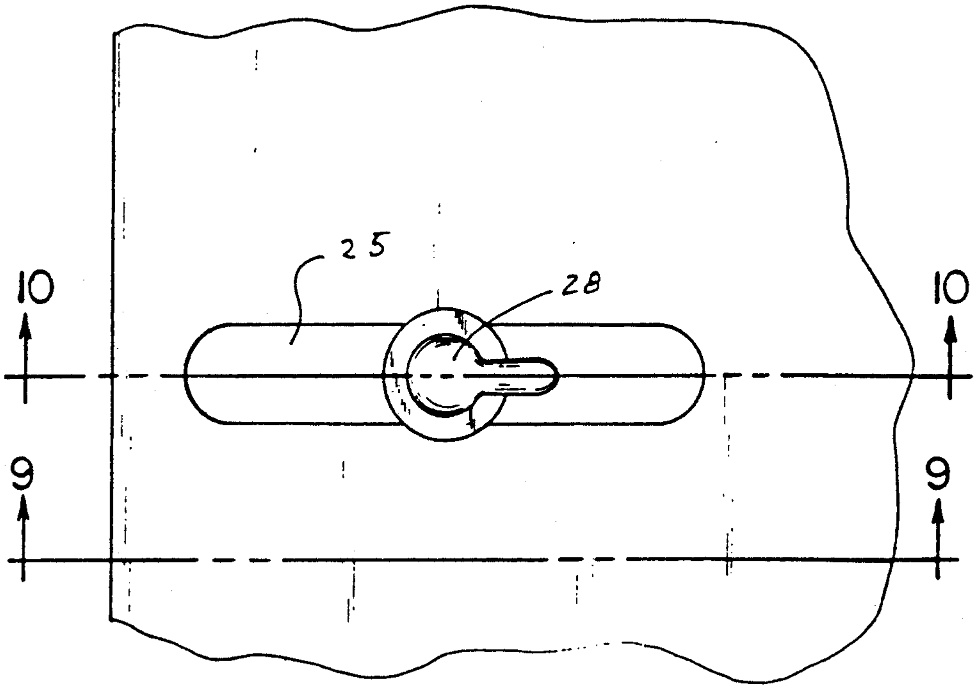
FIG. 8 is an orthographic partial bottom view of the shoe clamp member.
Figure 9:
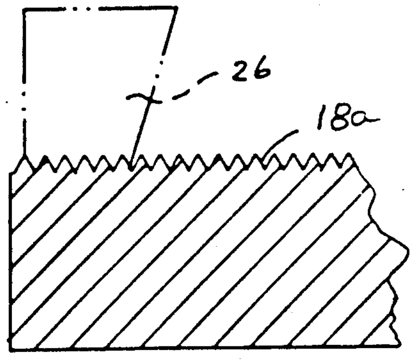
FIG. 9 is an orthographic view, taken along the lines 9—9 of FIG. 8 in the direction indicated by the arrows.
Figure 10:
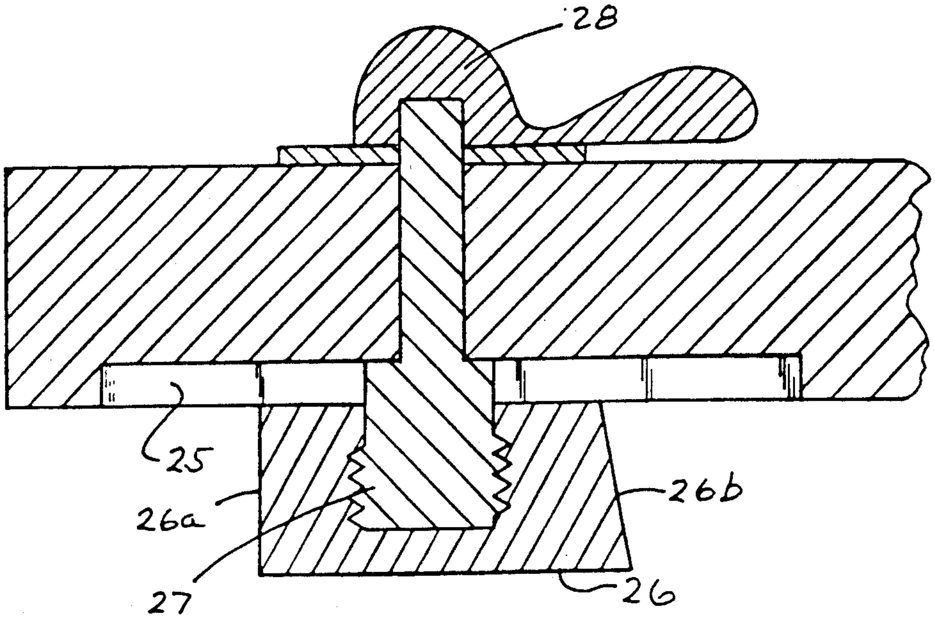
FIG. 10 is an orthographic view, taken along the lines 10—10 of FIG. 8 in the direction indicated by the arrows.

More specifically, the shoe dryer bracket apparatus 10 of the instant invention essentially comprises tubular cylinder 11 slidably mounting a cylindrical piston 12 therewithin, wherein the cylindrical piston 12 is coaxially aligned with the tubular cylinder 11 and biased exteriorly thereof to an extended configuration relative to the tubular cylinder 11 utilizing a spring "S" mounted between the cylindrical piston 12 and the tubular cylinder 11. Accordingly, the cylinder 11 and the piston 12 are aligned along a central cylindrical axis 13. A respective first and second mounting link 14 and 15 are fixedly mounted to the tubular cylinder 11 and are orthogonally oriented relative to the central cylindrical axis 13 and define an obtuse included angle 16 therebetween (see FIG. 4). Each outer end of the links 14 and 15 mount a shoe clamp member 17 thereon in an orthogonal relationship relative to the link 14. Each shoe clamp member 17 includes a support plate 18 defined by a predetermined length formed with a first side 19 spaced from and parallel a second side 20. A rear wall 23 is spaced from and parallel a forward wall 23*a*. A side flange 21 is coextensively and integrally mounted to the support plate 18 to a top surface thereof coextensive to the support plate, wherein the side flange includes an exterior wall aligned with the second side 20 and a side wall interior wall 22 that defines an acute included angle between the side flange interior wall 22 and a top surface of the support plate 18. A modified support plate 18*a*, as illustrated in FIG. 6 for example, utilizes a rear wall flange 24 that extends along the rear end wall medially thereof, whose outer side is aligned with the rear end wall 23 to position a shoe within the side flange 21 and rear flange 24. A wedge shaped clamping flange 26 is provided, with the wedge shaped clamping flange 26 including a plurality of shanks 27 orthogonally mounted to a bottom surface thereof spaced apart a predetermined spacing, with each shank 27 received within a slot 25 of a plurality of spaced parallel slots spaced apart the predetermined spacing, and wherein a fastener 28 is mounted to each terminal end of each shank 27 projecting through a bottom surface of each support plate 18. Further, the support plate 18 and its top surface may be formed of a plurality of spaced parallel ribs, as illustrated in FIG. 9, cooperative with companion ribs formed within a bottom surface of the clamping flange 26 to enhance positioning and alignment of the clamping flange relative to the top surface of the support plate 18*a*, with the ribs accordingly arranged parallel to the first and second sides 19 and 20 of the support plate 18*a*.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shoe dryer bracket apparatus arranged for securement between spaced vanes within a drum member, wherein the apparatus comprises, a tubular cylinder, the tubular cylinder reciprocatingly receiving a cylindrical piston therewithin, and the cylindrical piston biased exteriorly and coaxially of the tubular cylinder, wherein the tubular cylinder and the cylindrical piston are defined along a central cylindrical axis, and a first mounting link and a second mounting link, each fixedly mounted to an exterior surface of the tubular cylinder and orthogonally aligned relative to the central cylindrical axis, and each mounting link orthogonally mounting a clamp member at each free terminal end of each mounting link spaced from the tubular cylinder, and wherein each clamp member includes a support plate, the support plate including a support plate top surface and a support plate bottom surface, and each support plate bottom surface mounted to a respective mounting link, and each support plate including a first side spaced from and parallel to a second side, and a forward end wall spaced from and parallel a rear end wall, and a side flange coextensively mounted to the top surface of the support plate adjacent the second side. with the side flange including an exterior wall aligned with the second side, and including an interior side wall spaced from the exterior wall, with the interior wall defining an acute included angle between the interior wall and the top surface of the support plate, and wherein the first mounting link and the second mounting link define an obtuse included angle therebetween, and wherein the rear end wall includes a rear flange extending contiguously with the rear wall and medially thereof from the side flange to a plurality of spaced parallel slots, wherein the spaced parallels slots are arranged parallel relative to the forward and rear end wall, and further including a wedge shaped clamping flange, wherein the clamping flange is defined by a predetermined length and the support plate is defined by a predetermined length, wherein the wedge shaped clamping flange includes a plurality of shanks orthogonally mounted to a bottom surface of the clamping flange extending orthogonally to the bottom surface of the clamping flange, with the shank spaced apart the predetermined spacing, with each of the plurality of shanks extending through one of the plurality of parallel slots, and including a fastener securable to the shank extending exteriorly of the bottom surface of the support plate to align the clamping flange in a parallel relationship relative to the first side.

2. An apparatus as set forth in claim 1 wherein the top surface of the support plate includes a plurality of spaced parallel ribs and the bottom surface of the clamping flange includes a further plurality of spaced ribs, wherein a further plurality of spaced ribs are complementarily received within the spaced ribs of the support plate.

* * * * *